United States Patent
Matsuno et al.

(10) Patent No.: US 9,219,892 B2
(45) Date of Patent: Dec. 22, 2015

(54) CAMERA APPARATUS AND IMAGE PROCESSING METHOD WITH SYNCHRONOUS DETECTION PROCESSING

(71) Applicant: NISSAN MOTOR CO., LTD., Yokohama-shi, Kanagawa (JP)

(72) Inventors: Yosuke Matsuno, Atsugi (JP); Hiroshi Satoh, Atsugi (JP); Hidekazu Nishiuchi, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 121 days.

(21) Appl. No.: 13/779,147

(22) Filed: Feb. 27, 2013

(65) Prior Publication Data
US 2013/0229554 A1    Sep. 5, 2013

(30) Foreign Application Priority Data

Mar. 1, 2012  (JP) ................................. 2012-045370
Feb. 15, 2013  (JP) ................................. 2013-027786

(51) Int. Cl.
*H04N 9/04*  (2006.01)

(52) U.S. Cl.
CPC ..................................... *H04N 9/045* (2013.01)

(58) Field of Classification Search
CPC .............. H04N 13/02; H04N 13/0022; H04N 13/0029; H04N 13/0253; H04N 21/4223; H04N 13/0207; H04N 21/4542; H04N 5/2256; H04N 5/2353; H04N 5/2354; H04N 5/33
USPC ............................ 348/221.1, 222.1, 234, 297
See application file for complete search history.

(56) References Cited

U.S. PATENT DOCUMENTS

| | | | |
|---|---|---|---|
| 6,094,281 | A | 7/2000 | Nakai et al. |
| 7,463,772 | B1 | 12/2008 | Lefevere et al. |
| 2005/0007487 | A1* | 1/2005 | Miyoshi et al. ............... 348/362 |
| 2006/0100642 | A1 | 5/2006 | Yang et al. |
| 2006/0188849 | A1 | 8/2006 | Shamaie |
| 2006/0289760 | A1 | 12/2006 | Bathiche |
| 2008/0316434 | A1 | 12/2008 | Hung et al. |
| 2009/0019188 | A1 | 1/2009 | Mattice et al. |

(Continued)

FOREIGN PATENT DOCUMENTS

| | | |
|---|---|---|
| JP | 2008-145386 A | 6/2008 |
| JP | 2008-287625 A | 11/2008 |

OTHER PUBLICATIONS

U.S. Appl. No. 13/779,119, filed Feb. 27, 2013, Matsuno et al.

(Continued)

*Primary Examiner* — Twyler Haskins
*Assistant Examiner* — Padma Haliyur
(74) *Attorney, Agent, or Firm* — Foley & Lardner LLP

(57) ABSTRACT

An image taking unit takes an image by using a specific light projector which emits specific light in a wavelength region corresponding to one of the three primary colors of light and by exposing light receivers which are sensitive to light in wavelength regions corresponding to the three primary colors of light. A marker pulse generator generates an exposure timing pulse for the image taking unit, and an emission timing pulse for the specific light projector on the basis of a reference signal. A color image creator creates a color image from an image taken by the image taking unit. A synchronous detection processor creates a detection image by performing a synchronous detection process on the image taken by the image taking unit by use of the reference signal.

8 Claims, 7 Drawing Sheets

(56) References Cited

U.S. PATENT DOCUMENTS

| | | | |
|---|---|---|---|
| 2010/0303344 A1* | 12/2010 | Sato et al. | 382/162 |
| 2011/0124410 A1 | 5/2011 | Mao et al. | |
| 2012/0212582 A1 | 8/2012 | Deutsch | |
| 2012/0274745 A1 | 11/2012 | Russell | |
| 2013/0113956 A1 | 5/2013 | Anderson et al. | |
| 2013/0135081 A1 | 5/2013 | McCloskey et al. | |

OTHER PUBLICATIONS

USPTO Office Action, U.S. Appl. No. 13/779,119, Mar. 10, 2015, 16 pages.

USPTO Office Action, U.S. Appl. No. 13/779,119, Sep. 16, 2015, 14 pages.

* cited by examiner

| R+G | G | R+G | G |
|-----|-----|-----|-----|
| G | B+G | G | B+G |
| R+G | G | R+G | G |
| G | B+G | G | B+G |

CAMERA APPARATUS AND IMAGE PROCESSING METHOD WITH SYNCHRONOUS DETECTION PROCESSING

BACKGROUND OF THE INVENTION

1. Field of the Invention

The present invention relates to a camera apparatus for, and an image processing method of, creating a color image and a detection image based on emitted light.

2. Description of the Related Art

Japanese Patent Application Publication No. 2008-145386 (Patent Document 1) proposes an image taking apparatus for outputting a color image and a range image based on emitted infrared light by use of a single image taking unit. According to Patent Document 1, the image taking unit has a red (R) filter, a green (G) filter, a blue (B) filter, a filter IR1 or a filter IR2 for each of the pixels, where the filters IR1, IR2 have mutually-different frequency responses in the infrared region. The image taking apparatus proposed by Patent Document 1 generates the range image by: making a light projector emit light in a wavelength region which is transmitted through the filter IR2; comparing the amount of light received by the pixels in the filter IR1 with the amount of light received by the pixels in the filter IR2; and extracting the components of the emitted light. The pixels sensitive to the three primary colors are used to create the color image.

SUMMARY OF THE INVENTION

As described, the technique described in Patent Document 1 uses the pixels sensitive to the three primary colors only to create the color image, and uses the pixels sensitive to infrared light only to create the range image. This makes the range image lower in resolutions than the color image.

In light of the foregoing problem, an object of the present invention is to provide a camera apparatus and an image processing method which are capable of creating a high-resolution color image and a high-resolution detection image.

For the purpose of achieving the foregoing object, a first aspect of the present invention is summarized as a camera apparatus including a specific light projector, light receivers, an image taking unit, a marker pulse generator, a color image creator, and a synchronous detection processor. The specific light projector emits specific light in a wavelength region corresponding to one of the three primary colors of light. The light receivers are sensitive to light in respective wavelength regions corresponding to the three primary colors of light. The image taking unit takes an image by exposing the light receivers. The marker pulse generator generates an exposure timing pulse for the image taking unit, and an emission timing pulse for the specific light projector, on the basis of a reference signal. The color image creator creates a color image from the image taken by the image taking unit. The synchronous detection processor creates a detection image by performing a synchronous detection process on the image taken by the image taking unit by use of the reference signal.

DESCRIPTION OF THE EMBODIMENT

Figure 1:
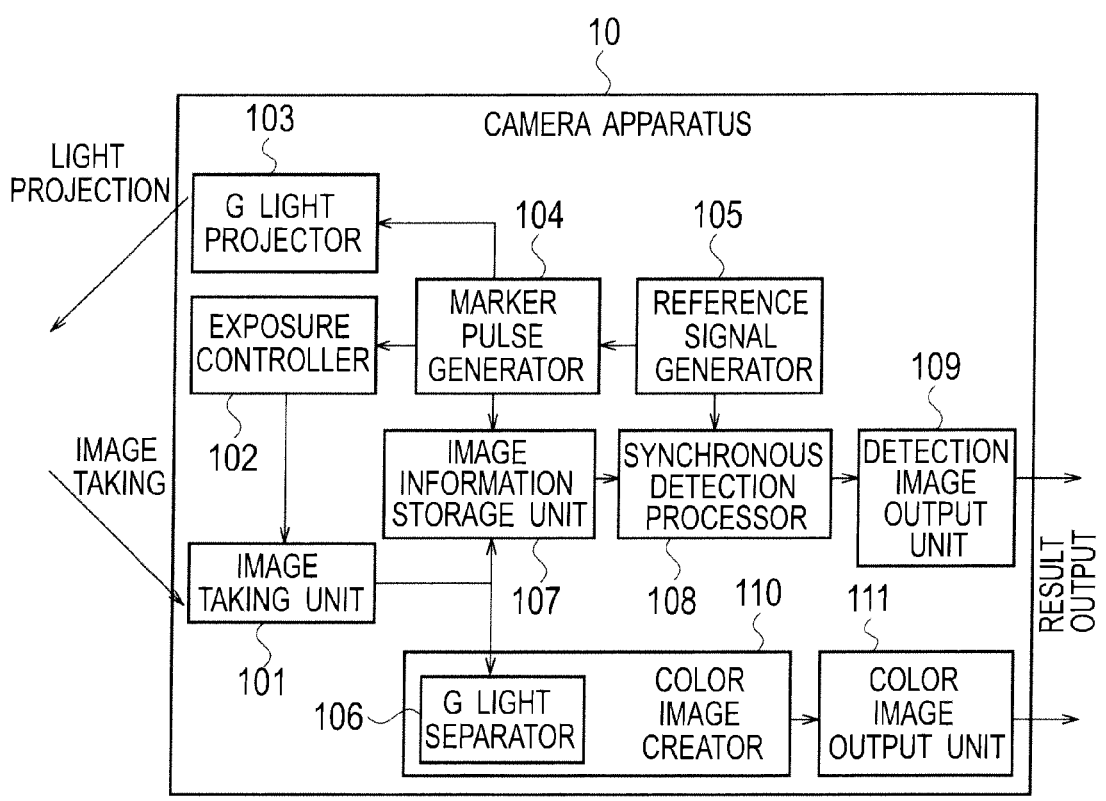
FIG. 1 is a block diagram for explaining a basic configuration of a camera apparatus of an embodiment of the present invention.

Next, descriptions will be provided on an embodiment of the present invention by referring to the drawings. The embodiment given below aims at showing examples of an apparatus and a method in which the technical ideas of the present invention are embodied. The technical ideas of the present invention are not limited to the apparatus or method exemplified in the following embodiment. Various changes can be made to the technical ideas of the present invention within the technical scope as recited in the scope of claims.

[Camera Apparatus]

As shown in FIG. 1, a camera apparatus of the embodiment of the present invention includes: an image taking unit 101 configured to take an image; an exposure controller 102 configured to control the exposure of the image taking unit 101; a specific light projector (G light projector) 103 configured to emit specific light (G light) in a wavelength region corresponding to one of the three primary colors of light; a marker pulse generator 104; a reference signal generator 105; an image information storage unit 107; a synchronous detection processor 108; a detection image output unit 109; a color image creator 110 including a specific light separator (G light separator) 106; and a color image output unit 111.

Figure 2:
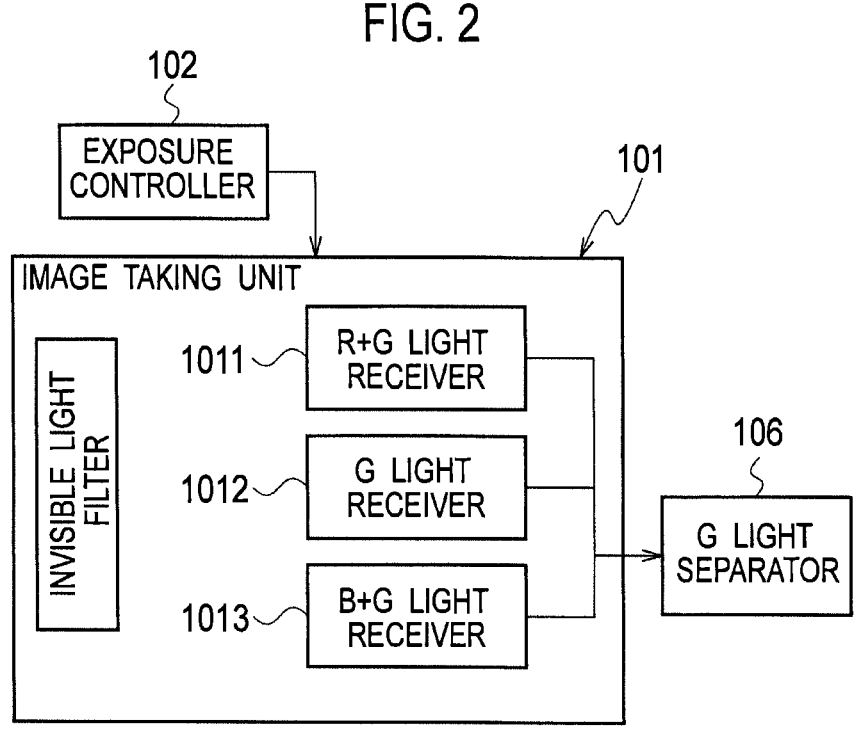
FIG. 2 is a block diagram for explaining an image taking unit included in the camera apparatus of the embodiment of the present invention.
Figure 3:
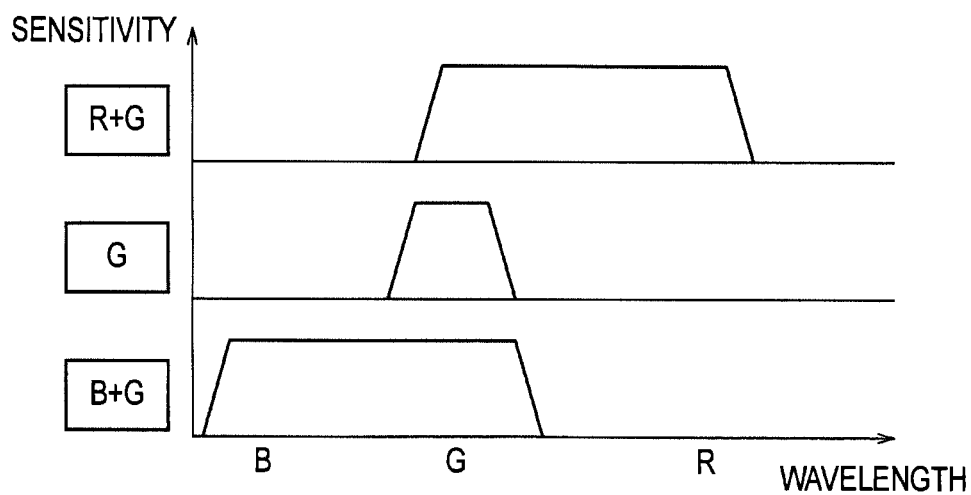
FIG. 3 is a diagram for explaining how sensitive each light receiver of the image taking unit included in the camera apparatus of the embodiment of the present invention is.

As shown in FIG. 2, the image taking unit 101 includes R+G light receivers 1011, G light receivers 1012, and B+G light receivers 1013. The image taking unit 101 includes an image sensor such as a CCD image sensor or a CMOS image sensor. As shown in FIG. 3, the R+G light receivers 1011 are sensitive to the wavelength range of red light (R light) and the wavelength range of specific light (G light). The G light receiver (specific light receiver) 1012 is sensitive to only light in a wavelength region corresponding to the light (G light) emitted by the specific light projector 103. The B+G light receiver 1013 is sensitive to wavelength regions corresponding to blue light (B light) and the specific light (G light).

Figures 4, 5:
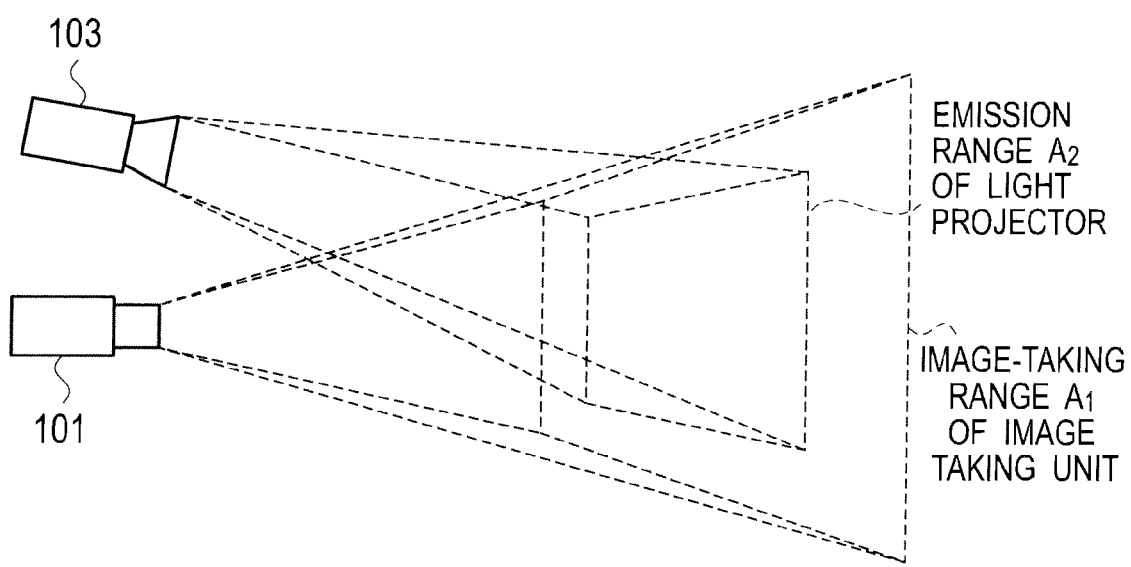
FIG. 4 is a diagram for explaining color filters of the image taking unit included in the camera apparatus of the embodiment of the present invention.
FIG. 5 is a diagram for explaining the image taking range of the image taking unit and the emission range of a light projector in the camera apparatus of the embodiment of the present invention.

The R+G light receivers 1011, the G light receivers 1012, and the B+G light receivers 1013 include color filters which are arrayed corresponding to multiple receiving optics of the image sensor, respectively. As shown in FIG. 4, the R+G light receivers 1011 include the color filters which transmit R light and G light; the G light receivers 1012 include the color filters which transmit G light; the B+G light receivers 1013 include the color filters which transmit B light and G light. The color filters are capable of enhancing an apparent resolution by being arranged in the Bayer array, for example.

The R+G light receivers 1011 and the B+G light receiver 1013 are commonly sensitive to light in the wavelength region corresponding to the specific light (G light), and respectively sensitive to light (R light and B light) in wavelength regions corresponding to the remaining two colors of the three primary colors of light, excluding the wavelength region of the specific light. The image taking unit 101 takes an image by: driving the electronic shutter with timing controlled by the exposure controller 102; and thus exposing the R+G light receiver 1011, the G light receiver 1012 and the B+G light receiver 1013.

The specific light projector 103 includes a light emitting diode (LED) and the like, for example. As shown in FIG. 5, the specific light projector 103 is placed in a way that an emission area $A_2$ set by the specific light projector 103 is included in an image taking range $A_1$ set by the image taking unit 101.

The reference signal generator 105 generates a reference signal for synchronous detection, which is expressed with a periodic function. The reference signal is expressed with sin ωF, for example. ω denotes the number of frames needed for the specific light projector 103 to emit the light in one periodic cycle. F denotes the number of frames.

Figure 6:
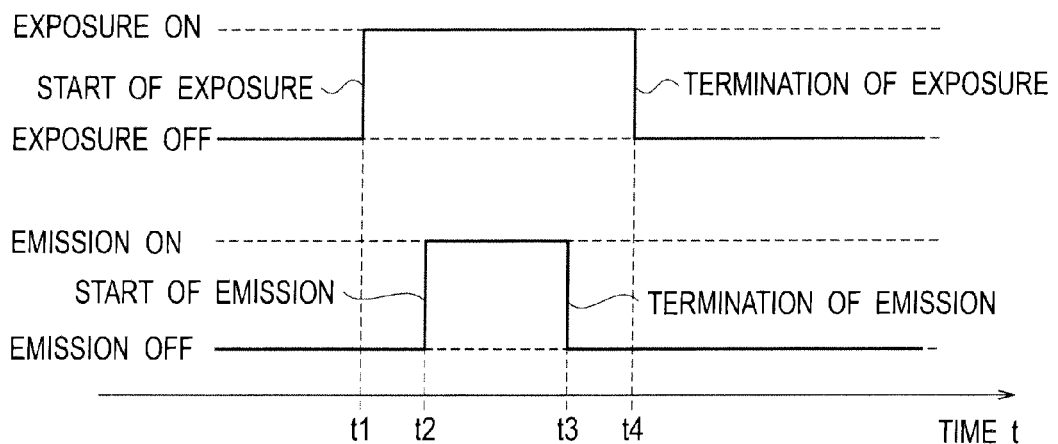
FIG. 6 is a timing chart for explaining exposure timing of the image taking unit and emission timing of the light projector in the camera apparatus of the embodiment of the present invention.

The marker pulse generator 104 generates an exposure timing pulse for the image taking unit 101, and an emission timing pulse for the specific light projector 103, through pulse width modulation or the like on the basis of the reference signal generated by the reference signal generator 105. As shown in FIG. 6, in accordance with the timing pulses generated by the marker pulse generator 104, the specific light projector 103 emits the light in a way that the length of time of emission from an emission starting time $t_2$ through an emission terminating time $t_3$ is included in the length of time of exposure from an exposure starting time $t_1$ through an exposure terminating time $t_4$ of the image taking unit 101.

Figure 7:
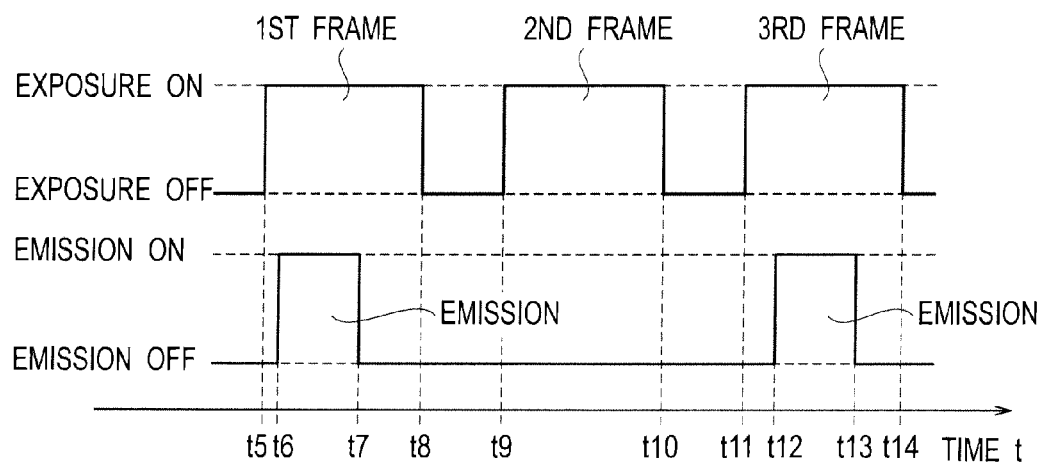
FIG. 7 is the other timing chart for explaining the exposure timing of the image taking unit and the emission timing of the light projector in the camera apparatus of the embodiment of the present invention.

The marker pulse generator 104 generates the emission timing pulse for the specific light projector 103 in synchronism with the exposure timing pulse for the image taking unit 101 in a way that the length of time of emission of the specific light projector 103 is included in the length of time of exposure of the image taking unit 101. In the case shown in FIG. 7, the specific light projector 103 emits the light during a length of time of exposure in each odd frame after the image taking unit 101 starts to take an image, while the marker pulse generator 104 generates the emission timing pulse by: judging, for each frame, whether or not the frame is the one for the specific light projector 103 to emit the light, on the basis of the reference signal generated by the reference signal generator 105; and setting timing and strength of the emission.

The specific light separator (G light separator) 106 separates a wavelength component in the same region as that of the specific light emitted by the specific light projector 103, from information about the brightness of pixels, which correspond to the R+G light receiver 1011 and the B+G light receiver 1013, in the image taken by the image taking unit 101. The wavelength in the same region as that of the specific light does not have to be exactly the same wavelength, and suffices to be virtually the same as that of the specific light.

In this respect, the brightness components of the three primary colors of light are denoted by R, G, B, while the brightness components of the light emitted by the specific light projector 103 is denoted by $G_r$. G denotes brightness components of specific light (G light) from the outside including the sun. In this respect, outputs from the R+G light receiver 1011, the G light receiver 1012 and the B+G light receiver 1013 can be denoted by $(R+G+G_r)$, $(G+G_r)$ and $(B+G+G_r)$, respectively.

The specific light separator 106 subtracts the output from the G light receiver 1012, which is the specific light receiver, from the outputs from the R+G light receiver 1011 and the B+G light receiver 1013, as expressed with Equations (1) to (3). Thereby, the specific light separator 106 is capable of separating the wavelength component of the specific light emitted by the specific light projector 103 from the information about the brightness of the pixels, which correspond to the R+G light receiver 1011 and the B+G light receiver 1013, in the image taken by the image taking unit 101.

$$(R+G+G_r)-(G+G_r)=R \qquad \text{Eq. (1)}$$

$$(G+G_r)=G+G_r \qquad \text{Eq. (2)}$$

$$(B+G+G_r)-(G+G_r)=B \qquad \text{Eq. (3)}$$

It should be noted that the specific light projector 103 is set in a way that the brightness component $G_r$ of the emitted G light is far smaller than the brightness component G of the G light from the outside. For this reason, the brightness component $G_r$ included in the output from the G light receiver 1012 is negligible.

The color image creator 110 creates a color image by: removing the wavelength component of the specific light, which is separated by the specific light separator 106, from the pixels corresponding to the R+G light receiver 1011 and the B+G light receiver 1013 in the image taken by the image taking unit 101; thereby acquiring the brightness components R, G, B of the three primary colors of light which are received by the R+G light receiver 1011, the G light receiver 1012 and the B+G light receiver 1013; and mapping the acquired brightness components R, G, B.

The color image output unit 111 converts the color image created by the color image creator 110 into an image in a predetermined format such as a format in compliance with the NTSC (National Television System Committee) standard or a format in compliance with the PAL (Phase Alternation by Line) standard, and outputs the resultant image to the outside.

The image information storage unit 107 receives, from the marker pulse generator 104, an emission flag indicating whether or not the frame is the one taken when the specific light projector 103 emits the light, and information about the periodic cycle of the reference signal which is generated by the reference signal generator 105 when the frame is taken. The image information storage unit 107 stores the image (frame) taken by the image taking unit 101, the emission flag, and the information about the periodic cycle in this order as image information for each frame.

The synchronous detection processor 108 creates a detection image by: retrieving the images which are taken by the image taking unit 101 and stored in the image information storage unit 107; and performing a synchronous detection process on the retrieved images by use of the reference signal generated by the reference signal generator 105. Once the image information storage unit 107 completes storing the images corresponding to one periodic cycle of the reference signal, the synchronous detection processor 108 retrieves the images corresponding to the one periodic cycle from the image information storage unit 107, and performs the synchronous detection process by multiplying all the pixels in each retrieved image by the reference signal which is generated when the image is taken. When the reference signal is expressed with sin ωt, the synchronous detection processor 108 extracts the brightness components $G_r$ of the light, which is emitted by the specific light projector 103, by performing the synchronous detection process as expressed with Equations (4) to (7). The synchronous detection processor 108 creates the detection image by mapping the extracted components of the specific light emitted by the specific light projector 103.

$$(R+G+G_r)\times\sin \omega t = G_r \qquad \text{Eq. (4)}$$

$$(G+G_r)\times\sin \omega t = G_r \qquad \text{Eq. (5)}$$

$$(B+G+G_r)\times\sin \omega t = G_r \qquad \text{Eq. (6)}$$

The detection image output unit 109 converts the detection image created by the detection image processor 108 into an image in the predetermined format such as a format in compliance with the NTSC (National Television System Committee) standard or a format in compliance with the PAL (Phase Alternation by Line) standard, and outputs the resultant image.

Figure 8A:
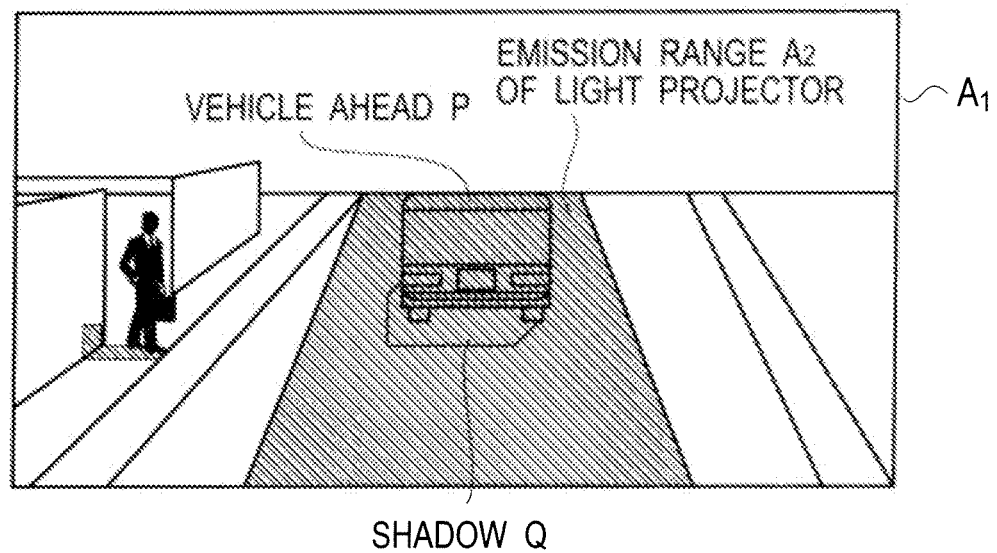
FIG. 8A shows an example of an image taken by the image taking unit of the camera apparatus of the embodiment of the present invention.
Figure 8B:
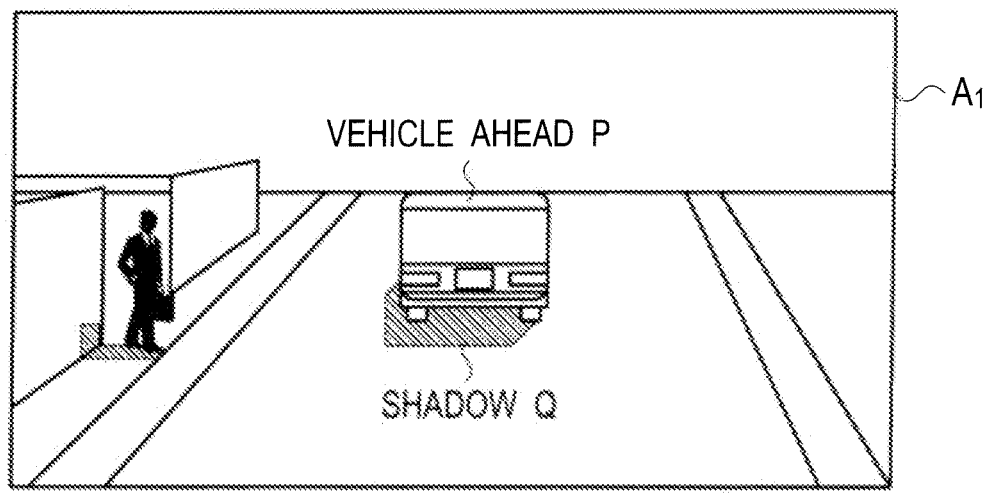
FIG. 8B shows an example of a color image created by the camera apparatus of the embodiment of the present invention.

As shown in FIG. 8A, an image which is taken by the image taking unit 101 when the specific light projector 103 emits specific light is formed from outside light and the specific light. As shown in FIG. 8B, an image which is taken by the image taking unit 101 when the specific light projector 103 emits no specific light is formed from outside light. For this reason, when an image of the space in front of your vehicle is taken, the shadow Q of a vehicle P ahead in the sunlight is shown in FIG. 8A like in FIG. 8B, even though within the emission area $A_2$ of the specific light projector 103.

Figure 9:
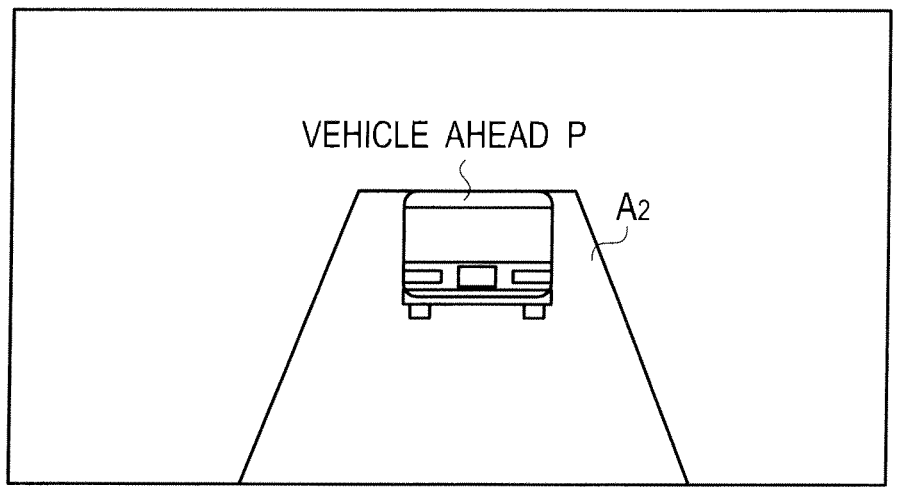
FIG. 9 shows an example of a synchronous detection image created by the camera apparatus of the embodiment of the present invention.

As shown in FIG. 9, the image outputted from the detection image output unit 109 represents the differential between the image shown in FIG. 8A and the image shown in FIG. 8B, and is accordingly formed from the specific light emitted by the specific light projector 103. For this reason, the image represents the emission area $A_2$ alone, and the shadow Q of the vehicle P ahead in the sunlight disappears from the image.

[Image Processing Method]

Figure 10:
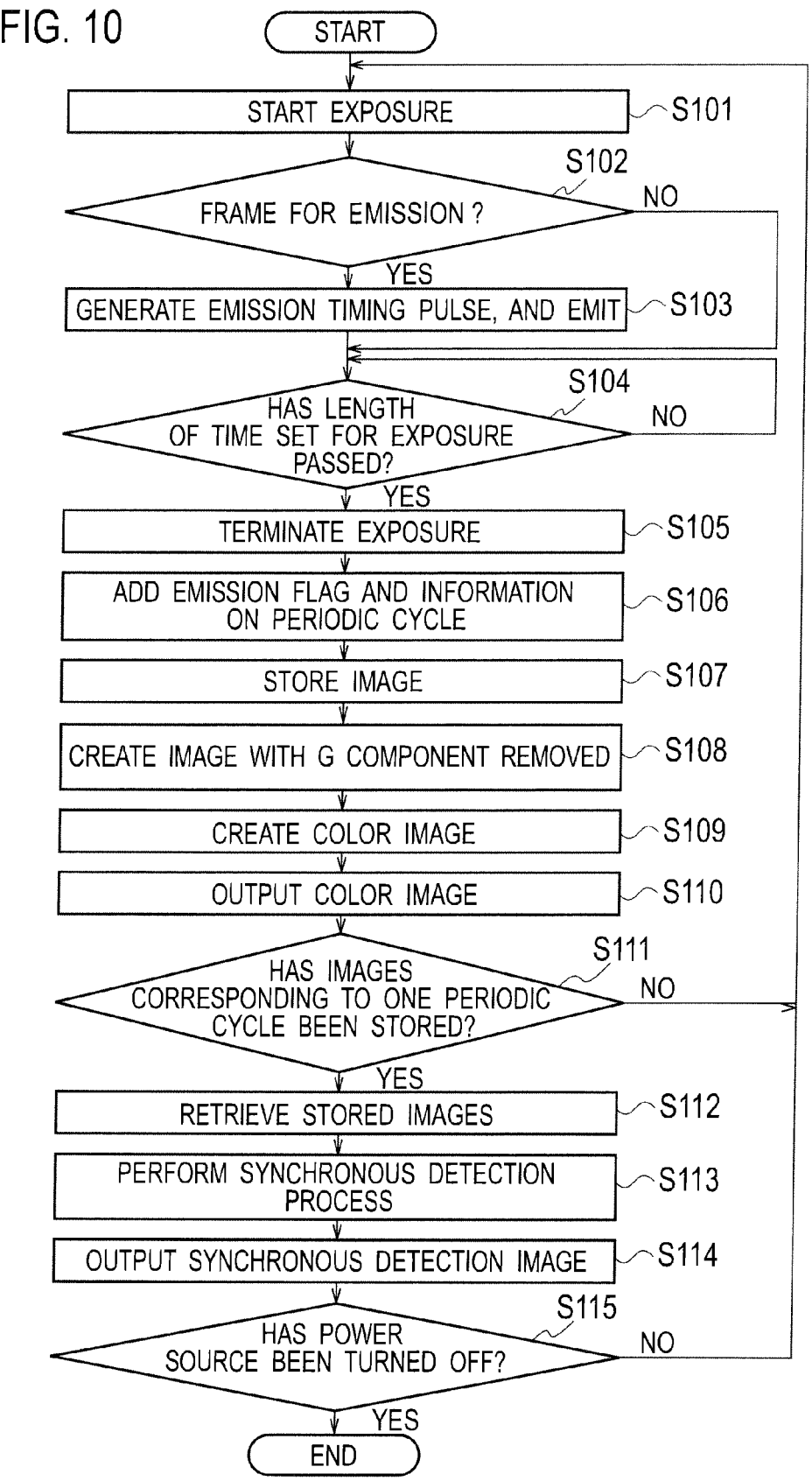
FIG. 10 is a flowchart for explaining an image processing method of the camera apparatus of the embodiment of the present invention.

Descriptions will be hereinbelow provided for an example of how the camera apparatus of the embodiment of the present invention works by use of a flowchart shown in FIG. 10.

First of all, in step S101, the marker pulse generator 104 generates the exposure timing pulse for the image taking unit 101 on the basis of the reference signal generated by the reference signal generator 105, and outputs the exposure timing pulse to the exposure controller 102. Under the control of the exposure controller 102, the image taking unit 101 exposes the R+G light receiver 1011, the G light receiver 1012, and the B+G light receiver 1013 to light.

Subsequently, in step S102, the marker pulse generator 104 judges whether or not the frame is the one for the specific light projector 103 to emit the specific light on the basis of the reference signal generated by the reference signal generator 105. If the marker pulse generator 104 judges that the frame is not the one for the specific light projector 103 to emit the specific light, the process proceeds to step S104.

If the marker pulse generator 104 judges in step 5102 that the frame is the one for the specific light projector 103 to emit the specific light, the marker pulse generator 104, in step S103, generates the emission timing pulse for the specific light projector 103 on the basis of the reference signal generated by the reference signal generator 105. The specific light projector 103 emits the specific light in response to the emission timing pulse generated by the marker pulse generator 104.

In step S104, the exposure controller 102 judges whether or not the length of time set for the exposure has passed on the basis of the exposure timing pulse generated by the marker pulse generator 104. If the length of time of the exposure has not passed yet, the exposure controller 102 continues the exposure by the image taking unit 101. If the length of time of the exposure has passed, the exposure controller 102 terminates the exposure by the image taking unit 101 in step S105.

In step S106, the marker pulse generator 104 outputs to the image information storage unit 107 the emission flag indicating whether or not the frame is the one taken when the specific light projector 103 emitted the specific light, and the information about the periodic cycle of the reference signal generated by the reference signal generator 105. For example, in a case where the frame taken through steps S101 to S105 has been subjected to the process in step S103, the marker pulse generator 104 sets the emission flag "ON." In a case where the frame taken through steps S101 to S105 has not been subjected to the process in step S103, the marker pulse generator 104 sets the emission flag "OFF."

In step S107, the image information storage unit 107 stores the frame taken through steps S101 to S105, as well as the emission flag and the information on the period cycle which are outputted from the marker pulse generator 104 in step S106, while making association among the frame, the emission flag and the information.

In step 108, the specific light separator 106 separates the wavelength component in the same region as that of the specific light emitted by the specific light projector 103 from the information about the brightness of the pixels, which correspond to the R+G light receiver 1011 and the B+G light receiver 1013, in the frame taken through steps S101 to S105.

In step 109, the color image creator 110 creates the color image by: acquiring the brightness components of the three primary colors from the information about the brightness of the frame from which the wavelength component of the specific light is separated in step S108; and mapping the brightness components of the three primary colors. In step S110, the color image output unit 111 converts the color image created by the color image creator 110 into an image in the predetermined format, and outputs the resultant image to the outside.

In step S111, the synchronous detection processor 108 judges whether or not the image information storage unit 107 has completed storing the image information corresponding to one periodic cycle of the reference signal for each frame. If the image information storage unit 107 has not completed storing the image information corresponding to the one periodic cycle, the process returns to step S101. If the image information storage unit 107 has completed storing the image information corresponding to the one periodic cycle, the synchronous detection processor retrieves the image information corresponding to the one periodic cycle of the reference signal from the image information storage unit 107 in step S112.

In step S113, the synchronous detection processor 108 creates the detection image by performing the synchronous detection process by use of the retrieved image information and the reference signal generated by the reference signal generator 105. The synchronous detection processor 108 performs the synchronous detection process by multiplying all the pixels of each retrieved image by the reference signal which is generated when the image is taken, and thus extracts the brightness components $G_r$ of the light emitted by the specific light projector 103. The synchronous detection processor 108 creates the detection image by mapping the thus-extracted components of the specific light emitted by the specific light projector 103.

In step S114, the detection image output unit 109 converts the detection image created by the synchronous detection processor 108 into an image in the predetermined format, and outputs the resultant image.

In step S115, if the power source or the driving switch turns off, the process is terminated. If the drive continues, the process returns to step S101.

The camera apparatus 10 of the embodiment of the present invention is capable of creating the detection image and the color image with high resolution, since: all the light receivers (1011 to 1013) of the image taking unit 101 are sensitive to the light in the wavelength region corresponding to the specific light emitted by the specific light projector 103; and the synchronous detection process is performed on all the outputs from the respective light receivers.

The camera apparatus 10 of the embodiment of the present invention is capable of creating the color image from which the wavelength component of the specific light is removed, since the output from the specific light receiver 1012 is subtracted from the outputs from the R+G light receiver 1011 and the B+G light receiver 1013.

The camera apparatus 10 of the embodiment of the present invention is simplified in the constitution of the color filters, since the green light in the middle wavelength region out of the three primary colors of light is employed as the specific light.

[Other Embodiments]

Although, as described above, the invention has been described on the basis of the foregoing embodiment, the description and drawings constituting part of this disclosure shall not be understood as limiting the present invention. Various alternative embodiments, examples and operation technologies will be clear to those skilled in the art from this disclosure.

The foregoing embodiment may include means for calculating the distance to the object from the brightness of the detection image created by the synchronous detection processor 108. This makes it possible for the user to learn the distance to the object and the position of the object on the image from the color image taken.

In addition, although the foregoing embodiment has been described, citing the example in which the light emitted by the specific light projector 103 is the G light, the specific light projector 103 may be instead configured to emit the R light or the B light. In this case, a configuration may be employed in which: the specific light receiver 1012 is sensitive to the light emitted by the specific light projector 103; and the other light receivers are sensitive to the remaining two colors of light.

Furthermore, in the foregoing embodiment, the specific light separator 106 may be configured to use an output (corresponding to time $t_9$ to $t_{10}$ in FIG. 7), which comes from the G light receiver 1012 while the specific light projector 103 emits no light, for the calculation of the brightness component G as expressed with Equation (2). This enables the color image creator 110 to acquire the brightness component G with high accuracy, and thus to reduce a deterioration of the image quality of the color image.

It is a matter of course that the present invention includes various embodiments and the like which have not been described herein. For this reason, the technical scope of the present invention shall be determined on the basis of only the matters to define the invention recited in the scope of claims which are considered appropriate from the foregoing descriptions.

The entire contents of Japanese Patent Applications No. 2012-045370 (filed on Mar. 1, 2012) and No. 2013-027786 (filed on Feb. 15, 2013) are incorporated herein by reference.

What is claimed is:

1. A camera apparatus comprising:
a specific light projector configured to emit specific light in a wavelength region corresponding to any one of the three primary colors of light;
three light receivers sensitive to light in wavelength regions corresponding to the three primary colors of light, respectively;
an image taking unit configured to take an image by exposing the light receivers;
a marker pulse generator configured to generate an exposure timing pulse for the image taking unit, and an emission timing pulse for the specific light projector, on the basis of a reference signal expressed with a periodic function;
a color image creator configured to create a color image from the image taken by the image taking unit; and
a synchronous detection processor configured to create a detection image by performing a synchronous detection process on the image taken by the image taking unit by use of the reference signal, wherein
the three light receivers include: a first pixel commonly sensitive to light in a wavelength region corresponding to the specific light and a wavelength region corresponding to one color out of the remaining two colors of the three primary colors of light excluding the wavelength region of the specific light; a second pixel commonly sensitive to light in a wavelength region corresponding to the specific light and a wavelength region corresponding to the other color out of the remaining two colors of the three primary colors of light excluding the wavelength region of the specific light; and a third pixel sensitive to light in the wavelength region corresponding to the specific light.

2. The camera apparatus of claim 1, wherein
the color image creator creates the color image by subtracting an output from the third pixel from each of outputs from the first pixel and the second pixel.

3. The camera apparatus of claim 2, wherein
the specific light projector emits green light, and
the third pixel is sensitive to the green light.

4. The camera apparatus of claim 1, further comprising:
a color image output unit configured to output the color image created by the color image creator; and
a detection image output unit configured to output the detection image created by the synchronous detection processor.

5. The camera apparatus of claim 2, further comprising:
a color image output unit configured to output the color image created by the color image creator; and
a detection image output unit configured to output the detection image created by the synchronous detection processor.

6. The camera apparatus of claim 3, further comprising:
a color image output unit configured to output the color image created by the color image creator; and
a detection image output unit configured to output the detection image created by the synchronous detection processor.

7. An image processing method comprising:
emitting specific light in a wavelength region corresponding to any one of the three primary colors of light;
taking an image by exposing three light receivers sensitive to light in wavelength regions corresponding to the respective three primary colors of light;
generating a timing pulse for the exposure, and a timing pulse for the emission of the specific light, on the basis of a reference signal expressed with a periodic function;
creating a color image from the taken image; and
creating a detection image by performing a synchronous detection process on the taken image by use of the reference signal, wherein
the three light receivers include: a first pixel commonly sensitive to light in a wavelength region corresponding to the specific light and a wavelength region corresponding to one color out of the remaining two colors of the three primary colors of light excluding the wavelength region of the specific light; a second pixel commonly sensitive to light in a wavelength region corresponding to the specific light and a wavelength region corresponding to the other color out of the remaining two colors of the three primary colors of light excluding the wavelength region of the specific light; and a third pixel sensitive to light in the wavelength region corresponding to the specific light.

8. A camera apparatus comprising:
a specific light projecting means for emitting specific light in a wavelength region corresponding to any one of the three primary colors of light;
three light receivers sensitive to light in wavelength regions corresponding to the three primary colors of light, respectively;
an image taking means for taking an image by exposing the light receivers;
a marker pulse generating means for generating an exposure timing pulse for the image taking means, and an emission timing pulse for the specific light projecting means, on the basis of a reference signal expressed with a periodic function;
a color image creating means for creating a color image from the image taken by the image taking means; and
a synchronous detection processing means for creating a detection image by performing a synchronous detection process on the image taken by the image taking means by use of the reference signal, wherein
the three light receivers include: a first pixel commonly sensitive to light in a wavelength region corresponding to the specific light and a wavelength region corresponding to one color out of the remaining two colors of the three primary colors of light excluding the wavelength region of the specific light; a second pixel commonly sensitive to light in a wavelength region corresponding to the specific light and a wavelength region corresponding to the other color out of the remaining two colors of the three primary colors of light excluding the wavelength region of the specific light; and a third pixel sensitive to light in the wavelength region corresponding to the specific light.

\* \* \* \* \*